United States Patent [19]

Barker et al.

[11] 4,336,044
[45] Jun. 22, 1982

[54] PROCESS FOR SEPARATING COAL SYNTHESIZED METHANE FROM UNREACTED INTERMEDIATE AND CONTAMINANT GASES

[75] Inventors: Ray E. Barker, Knoxville; Charles D. Scott; Allen D. Ryon, both of Oak Ridge, all of Tenn.

[73] Assignee: The United States of America as represented by the United States Department of Energy, Washington, D.C.

[21] Appl. No.: 200,799

[22] Filed: Oct. 27, 1980

[51] Int. Cl.³ .............................................. F25J 3/02
[52] U.S. Cl. .......................................... 62/17; 62/28; 55/68; 55/73; 48/197 R
[58] Field of Search .................... 62/17, 24, 27, 28; 55/68, 73; 48/197 R

[56] References Cited

U.S. PATENT DOCUMENTS 3,130,026  4/1964  Becker .................................. 62/24
4,149,864  4/1979  Eakman et al. ....................... 62/28
4,152,129  5/1979  Trentham et al. ..................... 62/28

Primary Examiner—Norman Yudkoff
Attorney, Agent, or Firm—Edwin D. Grant; Stephen D. Hamel; Richard G. Besha

[57] ABSTRACT

Gas produced from coal and containing $CH_4$, $CO$, $CO_2$, $H_2$ and $H_2S$ is contacted with $CO_2$ scrub liquid to form (1) a liquid $CO_2$ stream containing as solutes $CH_4$, $H_2S$ and minor portions of the $CO$ and $H_2$, and (2) a gas stream containing $CO_2$ and major portions of the $CO$ and $H_2$, the $CO$ and $H_2$ in this stream being recycled to the means which produces gas from coal, and $CO_2$ in the stream being recycled to the scrub liquid. The solute-bearing liquid $CO_2$ stream is fractionated into (1) a liquid $CO_2$ stream containing $CH_4$ and $H_2S$, and (2) a $H_2/CO$ gas stream which is recycled into contact with the scrub liquid. The last-mentioned liquid $CO_2$ stream is fractionated into (1) a $CH_4/CO_2$ gas stream the $CO_2$ of which is recycled to the scrub liquid, and (2) a liquid $CO_2$ stream containing $H_2S$, and $CO_2$ of this stream is also recycled to the scrub liquid.

6 Claims, 1 Drawing Figure

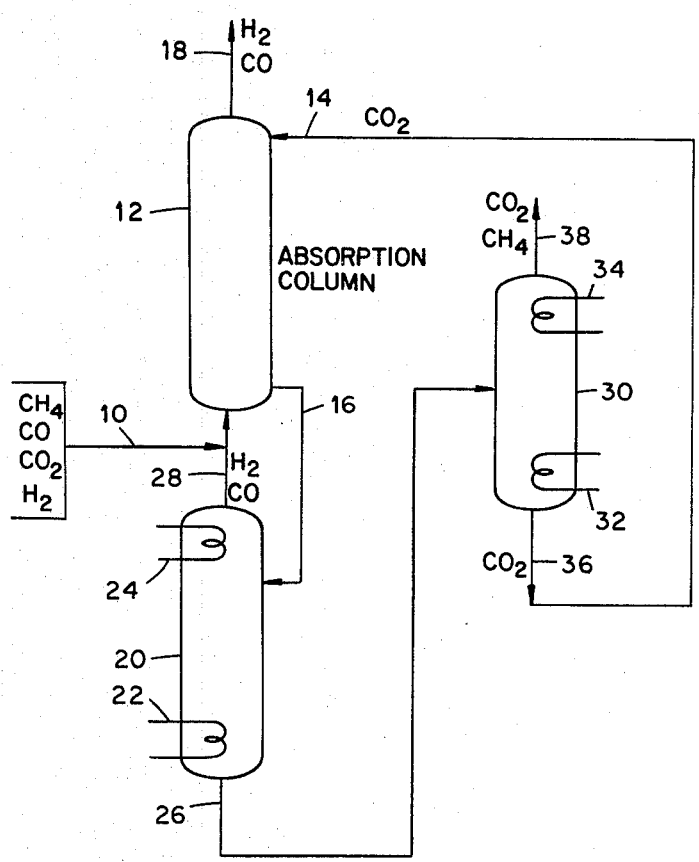

PROCESS FOR SEPARATING COAL SYNTHESIZED METHANE FROM UNREACTED INTERMEDIATE AND CONTAMINANT GASES

BACKGROUND OF THE INVENTION

This invention is a result of a contract with the United States Department of Energy.

It relates in general to the production of methane from coal or other hydrocarbon materials, and more particularly to a process for separating methane from other gases associated therewith in the conversion of coal to fuel gas.

Hydrocarbon fuel gas synthesized from coal must be separated from contaminants simultaneously formed therewith by presently developed coal gasification processes, these contaminants including water, ammonia, hydrogen sulfide, and carbon dioxide. Current technology provides effective processes for separating the named contaminants from a synthesized gas such as methane. However, synthesized methane usually must also be separated from the unreacted carbon monoxide and hydrogen from which it is formed, and the herein-disclosed invention provides an improved means for accomplishing this separation while also separating hydrogen sulfide from the methane.

PRIOR ART

It has been previously suggested that cryogenic distillation can be used for separating carbon monoxide and hydrogen from synthesized methane as the final step in cleaning the methane. However, cryogenic distillation at this point results in conditions of temperature ($-120°$ C.) and pressure (10 atm) of the product gas which make it unsuitable for delivery to conventional transporting equipment such as pipelines.

SUMMARY OF THE INVENTION

It is therefore an object of this invention to provide an efficient process for removing contaminant and unreacted methane-forming gases from methane.

A more specific object of this invention is to separate synthesized methane from other coal derivatives by using one of the derivatives, carbon dioxide, as a basic processing solvent for accomplishing this separation.

Another object of this invention is to employ both absorption and fractionation process steps to separate methane from other gases obtained by coal gasification, so that the methane is delivered under temperature and pressure conditions enabling it to be conveniently handled and transported in pipelines.

These objects are achieved, in accordance with a preferred process embodiment of the invention, by a first process step in which carbon dioxide is used as a scrub liquid in an absorption column to absorb methane from a gas stream synthesized from coal, with most of the carbon monoxide and hydrogen in the gas stream, along with some carbon dioxide, passing in the gas effluent from the column. The methane-carrying stream of liquid carbon dioxde from the absorption column is introduced into a first fractionation column in which the carbon monoxide and hydrogen remaining in the scrub liquid are stripped therefrom and recycled to the absorption column. A second fractionation colum is then employed to separate the desired methane product from the liquid carbon dioxide stream drawn from the first fractionation column. Hydrogen sulfide and heavy hydrocarbon components of the synthesized gas introduced into the absorption column are absorbed in the carbon dioxide scrub liquid and are included in the liquid carbon dioxide stream discharged from the second fractionation column. Carbon dioxide gas discharged from the absorption column along with carbon monoxide and hydrogen, and discharged from the second fractionation column along with methane, can be recovered and recycled to the carbon dioxide scrub liquid introduced into the absorption column.

DESCRIPTION OF THE DRAWING

The accompanying drawing is a flow diagram of a preferred embodiment of the invention, process streams being designated therein by reference numbers associated with arrows representing the streams and their directions of flow.

DETAILED DESCRIPTION

In the drawing reference number 10 designates a gas stream such as is obtained by gasification of coal. Stream 10 may contain, for example, carbon dioxide, carbon monoxide, hydrogen, desired products such as methane and other heavier hydrocarbon derivatives of coal, and contaminants such as water, ammonia, and hydrogen sulfide. Since the named contaminants and hydrocarbons such as ethane can be separated from methane by known processes and since this invention is primarily concerned with the separation of methane from carbon dioxide, carbon monoxide, and hydrogen and with the recycling of the later into process streams as set forth hereinafter, the concentrations of process streams presented hereinafter in the described process embodiment of the invention will not include contaminant concentrations or concentrations of hydrocarbons other than that of methane. However, as will be pointed out, the preferred process embodiment of the invention is useful for separating methane from other constituents which may be included in feed stream 10.

Feed stream 10 may have, for example, the following mole fraction composition: 0.205 $CO_2$; 0.357 $H_2$; 0.100 CO; and 0.338 $CH_4$. The feed stream may also include contaminants such as $H_2S$ and hydrocarbon derivatives of coal containing at least two carbon atoms, such as ethane. Stream 10 is preferably introduced into the lower portion of an absorption column 12 at a temperature of about $-23°$ C., and at the upper portion of the column a gas-absorbing, or scrub, stream 14 of liquid $CO_2$ is introduced at a temperature of about $-28°$ C. and in a ratio of about 540 gram moles of $CO_2$ per 100 gram moles of feed stream 10. The pressure in column 12 is preferably maintained at about 69 atm.

Most of the $CH_4$ in feed stream 10 is absorbed in the liquid $CO_2$ scrub stream 14 which flows into and through column 12. More specifically, under the described feed, temperature, and pressure conditions at which column 12 is operated, an effluent liquid 16 referred to hereinafter as the solute-carrying stream is discharged from the lower portion of column 12 at a temperature of about $-11°$ C. and with solutes from feed stream 10 dissolved therein in approximately the following mole fraction composition: 0.885 $CO_2$; 0.013 $H_2$; 0.015 CO; and 0.087 $CH_4$. Most of the $H_2$ and CO contained in feed stream 10 passes from column 12 in an effluent gas stream (referred to hereinafter as the non-absorbed gas) the temperature of which is about $-27°$ C. and which has approximately the following mole fraction composition: 0.317 $CO_2$; 0.515 $H_2$; 0.142 CO;

and 0.026 CH$_4$. The operation of column 12 is such that about 69.4 gram moles of non-absorbed gas and 620.5 gram moles of solute-carrying liquid flow from the column per 100 gram moles of feed stream 10. As will be described hereinafter, a recycled gas is introduced into column 12 along with the feed gas stream. An important advantage of the invention is also achieved by recycling H$_2$ and CO in the non-absorbed gas 18 to a coal gasification process means which produces feed stream 10, since these gases react to form CH$_4$, the desired component of the feed stream. Furthermore, it is advantageous to recycle CO$_2$ in non-absorbed gas 18 to scrub stream 14. Conventional apparatus can be used to separate H$_2$ and CO from CO$_2$ in the non-absorbed gas.

As illustrated in the flow diagram, solute-carrying stream 16 is introduced into the upper portion of a first fractionation column 20 provided with a conventional reboiler 22 and condenser 24. The pressure in first fractionation column 20 is maintained at about 60 atm, and reboiler 22 and condenser 24 are operated at temperatures such that a condensate stream 26 (referred to hereinafter as the first fractionator bottoms stream) is obtained from the column which has a temperature of about 16° C. and approximately the following mole fraction composition: 0.944 CO$_2$; $8 \times 10^{-8}$ H$_2$; $2.5 \times 10^{-4}$ CO; and 0.056 CH$_4$. The gas stream 28 (referred to hereinafter as the recycle gas for a reason that will soon become evident) flowing from column 20 has, under the described operating conditions of the column, a temperature of about $-44°$ C. and approximately the following mole fraction composition: 0.212 CO$_2$; 0.164 H$_2$; 0.184 CO; and 0.440 CH$_4$.

Recycle gas 28 is introduced in the pipeline which feeds synthesized gas to absorption column 12. Hence hydrogen, carbon monoxide, and methane absorbed in the liquid carbon dioxide stream 16 discharged from the column and then evaporated from the stream in first fractionation column 20 are returned to column 12 along with CO$_2$, where most of the methane is again absorbed in the carbon dioxide scrub liquid and most of the hydrogen and carbon monoxide is released in the effluent gas stream 18. Under the preferred operating conditions for first fractionation column 20, 570.6 gram moles of first fractionator bottoms 26 and 50 gram moles of recycle gas 28 flow from the column per 100 gram moles of synthesized gas 10 entering absorption column 12.

From column 20 the first fractionator bottoms stream 26 is fed to a second fractionation column 30 also provided with a conventional reboiler 32 and condenser 34. The pressure in second fractionation column 30 is maintained at about 65 atm, and reboiler 32 and condenser 34 are operated at temperatures such that a condensate stream 36 (referred to hereinafter as the second fractionator bottoms stream) is obtained from the column which has a temperature of about 25° C. and approximately the following mole fraction composition: 0.994 CO$_2$; $4 \times 10^{-9}$ H$_2$; $2 \times 10^{-6}$ CO; and 0.005 CH$_4$. The gas stream 38 (referred to hereinafter as the product gas) flowing from column 30 has, under the described operating conditions of the column, a temperature of about $-32°$ C. and approximately the following mole fraction composition: 0.339 CO$_2$; $5.7 \times 10^{-6}$ H$_2$; 0.004 CO; and 0.657 CH$_4$. Thus it will be manifest that the above-described process steps provide a mixture of CH$_4$ and CO$_2$ as a product gas substantially free of H$_2$ and CO, and a second fractionator bottoms stream 36 substantially free of CH$_4$. Fractionator bottoms 36 will also contain most of the hydrocarbons in synthesized gas 10 that are heavier than CH$_4$, and also most of the contaminants, such as H$_2$S, in gas 10. Product gas 38 is delivered at conditions of temperature and pressure making it suitable for direct introduction into pipelines.

To operate the described process with scrub liquid 14 present in feed gas 10, CO$_2$ in second fractionator bottoms 36 and product gas 38 is recycled to absorption column 12. Conventional processes can be used to separate CO$_2$ in second fractionator bottoms 36 from solutes dissolved therein and to separate and liquify CO$_2$ in product gas 38.

The following table summarizes operating conditions of the preferred process embodiment of this invention and the compositions of flow streams described above.

TABLE

| Stream | OPERATING CONDITIONS | | | STREAM COMPOSITION (Mole Fractions) | | | |
|---|---|---|---|---|---|---|---|
| | Flow Ratio g moles of stream 100 g moles of feed | T (°C.) | P (Atm) | CO$_2$ | H$_2$ | CO | CH$_4$ |
| Synthesized gas 10 | Not applicable | $-23$ | 69 | .205 | .357 | .100 | .338 |
| Scrub liquid 14 | 540 | $-28$ | 69 | 1.0 | | | |
| Non-absorbed gas 18 | 69.4 | $-27$ | 69 | .317 | .515 | .142 | .026 |
| Solute-carrying liquid 16 | 620.6 | $-11$ | 69 | .885 | .013 | .015 | .087 |
| Recycle gas 28 | 50 | $-44$ | 68 | .212 | .164 | .184 | .440 |
| First fractionator bottoms 26 | 570.6 | 16 | 68 | .944 | $8 \times 10^{-8}$ | $2.5 \times 10^{-4}$ | .056 |
| Product gas 38 | 45.6 | $-32$ | 65 | .339 | $5.7 \times 10^{-6}$ | .004 | .657 |
| Second fractionator bottoms 36 | 525 | 25 | 65 | .994 | $4 \times 10^{-9}$ | $2 \times 10^{-6}$ | .005 |

What is claimed is:

1. A process for separating components of a synthesized gas containing methane, hydrogen, carbon monoxide and carbon dioxide, comprising the steps of:

contacting said synthesized gas with a liquid carbon dioxide scrub stream in an absorption column to form (1) a solute-carrying liquid carbon dioxide stream having dissolved therein a major portion of the methane in said synthesized gas, and (2) a gas stream comprising major portions of the hydrogen and carbon monoxide in said synthesized gas;

fractionating said solute-carrying stream in a first fractionating column to form (1) a first fractionator bottoms comprising liquid carbon dioxide having dissolved therein the major portion of the methane in said solute-carrying stream, and (2) a recycle gas comprising methane, carbon dioxide, and major portions of the residual hydrogen and carbon monoxide in said solute-carrying stream;

recycling said recycle gas into contact with said scrub stream in said absorption column;

fractionating said first fractionator bottoms in a second fractionation column to form (1) a second fractionator overhead gas stream rich in methane and (2) a second fractionator bottoms comprising liquid carbon dioxide substantially free of methane; and recycling said liquid carbon dioxide of said second fractionator bottoms to said scrub stream introduced into said absorption column.

2. The process of claim 1 wherein about 540 gram moles of said scrub stream carbon dioxide are introduced into an absorption column per 100 gram moles of said synthesized gas.

3. The process of claim 2 wherein about 570.6 gram moles of said first fractionator bottoms and 50 gram moles of said recycle gas flow from a fractionation column per 100 gram moles of said synthesized gas.

4. The process of claim 1 wherein said synthesized gas contains hydrogen sulfide and at least one hydrocarbon having at least two carbon atoms, and these components are dissolved in said solute-carrying stream and said first and second fractionator bottoms.

5. The process of claim 1 wherein hydrogen and carbon monoxide in said non-absorbed gas are recycled to a process means which forms methane contained in said synthesized gas.

6. The process of claim 1 wherein carbon dioxide in said non-absorbed gas, said product gas, and said second fractionator bottoms is recycled to said scrub stream.

* * * * *